United States Patent
Bejjani et al.

(10) Patent No.: US 6,301,289 B1
(45) Date of Patent: Oct. 9, 2001

(54) TO A TELECOMMUNICATION SYSTEM USING CODE DIVISION MULTIPLE ACCESS (CDMA)

(75) Inventors: Elie Bejjani, Saint-Cloud; Jean-François Bouquier; Benoît de Cacqueray, both of Paris, all of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/315,066

(22) Filed: May 20, 1999

(30) Foreign Application Priority Data

Mar. 25, 1999 (EP) .................................................. 99400723

(51) Int. Cl.$^7$ ....................................................... H04L 5/00
(52) U.S. Cl. ......................... 375/144; 375/148; 375/358; 455/63; 455/296
(58) Field of Search ..................................... 375/144, 145, 375/148, 149, 354, 356, 358; 455/295, 296, 304

(56) References Cited

U.S. PATENT DOCUMENTS

| | | | |
|---|---|---|---|
| 5,109,390 | * 4/1992 | Gilhousen et al. | 375/1 |
| 5,323,418 | * 6/1994 | Ayerst et al. | 375/1 |
| 5,481,533 | * 1/1996 | Honig et al. | 370/18 |
| 5,568,473 | * 10/1996 | Hemmati | 370/18 |
| 5,697,053 | * 12/1997 | Hanly | 455/33.1 |
| 5,790,549 | 8/1998 | Dent . | |
| 5,825,835 | * 10/1998 | Kingston et al. | 375/367 |
| 5,953,369 | * 9/1999 | Suzuki | 375/206 |
| 5,978,413 | * 11/1999 | Bender | 375/206 |
| 6,034,986 | * 3/2000 | Yellin | 375/200 |

FOREIGN PATENT DOCUMENTS

| | | |
|---|---|---|
| 0 493 904 A2 | 7/1992 | (EP) . |
| WO 94/28643 | 12/1994 | (WO) . |
| WO 97/32413 | 9/1997 | (WO) . |

OTHER PUBLICATIONS

M. Ewerbring et al, "CDMA with Interference Cancellation: A Technique for High Capacity Wireless Systems", Proceedings of the International Conference on Communications (ICC), Geneva, May 23–26, 1993, vol. 3, May 23, 1993, pp. 1901–1906 XP00044845.

* cited by examiner

*Primary Examiner*—Stephen Chin
*Assistant Examiner*—Dac V. Ha
(74) *Attorney, Agent, or Firm*—Sughrue, Mion, Zinn, Macpeak & Seas, PLLC

(57) ABSTRACT

The invention relates to a telecommunication method, wherein: terminals communicate through a central station, uplink and downlink communications are coded with a spread spectrum sequence, and terminals have different powers. At the central station, interference cancellation is performed in order to reduce the interfering effect of the highest power signals on the detected lowest power signals. In this method, at least for some of the most powerful interfering signals, groups of symbols ($TS_1$, $TS_3$) of different interfering signals are time aligned when they reach the central station. Preferably, the synchronized groups of symbols are synchronously detected at the central station and are processed jointly prior to be subtracted from the signal to be detected.

14 Claims, 2 Drawing Sheets

FIG.1
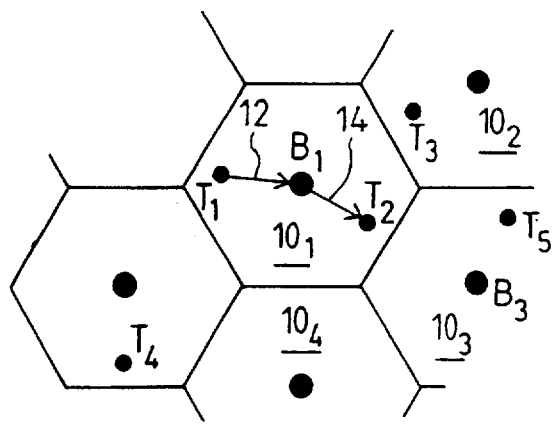
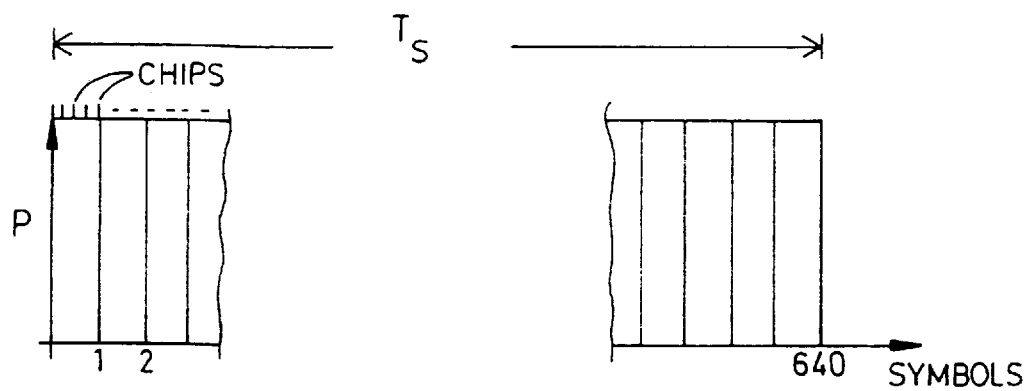
FIG.2a
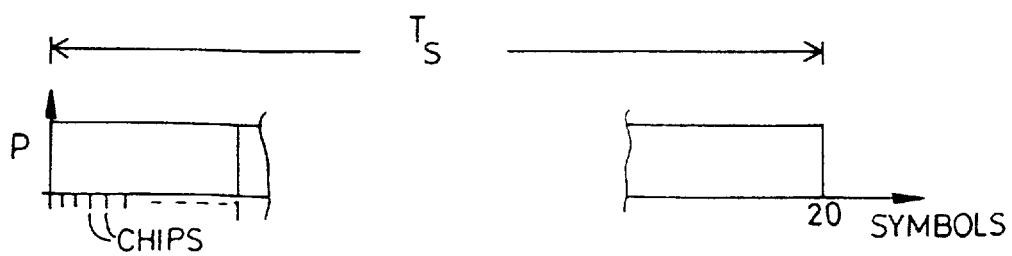
FIG.2b

TO A TELECOMMUNICATION SYSTEM USING CODE DIVISION MULTIPLE ACCESS (CDMA)

BACKGROUND OF THE INVENTION

The invention relates to a telecommunication system and to a telecommunication method for a network comprising central stations and wherein terminals communicate with the network through one central station.

It relates more particularly, but not exclusively, to the "Universal Mobile Telecommunication System" (UMTS).

In a system of this kind, the territory of the network is divided into zones, or cells. A central, or base, station is provided for each cell and the terminals, such as mobile telephones, can communicate through the central station.

In these systems, the radio resource management is complex, because terminals inside one zone must not interfere with each other and there must not be any interference between terminals in different zones. Several technologies are known for the sharing of radio resources: for instance, in the GSM system, the resources are distributed in frequencies and in time. The distribution in time is called "time division multiple access" (TDMA); in this case, two different communications using a same frequency resource are separated in time.

Another way of sharing the resources is to use the "CDMA" technique. In this case, a plurality of communications can simultaneously (at the same time) use the same frequency.

CDMA stands for "Code Division Multiple Access". In this case, each user is allocated a code which consists essentially in a spread spectrum sequence such as a Hadamard (or Walsh) sequence, wherein all the sequences are orthogonal. To this sequence is superimposed a scrambling or pseudo noise (PN), generally a Gold sequence.

When the central station transmits to terminals (downlink transmission) messages coded in this way, each terminal receives its own message together with all the others. This terminal can recover its own message because it multiplies the received signals by its own code, i.e. its own spread sequence, and, therefore, the other messages are eliminated due to the orthogonality between the codes.

In such a downlink communication, between the base and the terminals, the PN sequence is used to avoid interference between the corresponding zone and the neighboring zones; in fact, different scrambling sequences are used for the neighboring zones. Moreover, with such scrambling it is possible to take advantage of the multipath diversity.

For uplink communications, i.e. communications transmitted from terminals to the central station, CDMA is also used to distinguish communications coming from different terminals. However, spread spectrum sequences transmitted by two different terminals are generally not orthogonal because they do not reach simultaneously the central station; in fact, it is well known that the orthogonality between Hadamard sequences can be obtained only when there is an accurate synchronism between such sequences. For such uplink communications, different scrambling sequences are used to distinguish communications originating from different terminals.

However, for these uplink communications, orthogonal spread spectrum sequences are used in order to make the distinction between communications transmitted by the same terminal. For instance, a Hadamard sequence is allocated to the information itself and another Hadamard sequence is allocated to control signals such as power or pilot controls. Some terminals may also be able to transmit simultaneously several kinds of information signals, such as speech, data, fax, Internet, video, etc. These communications of different natures are provided with orthogonal Hadamard sequences. As they originate from the same terminal, they arrive simultaneously at the central station and, therefore, can be easily discriminated due to their orthogonal codes.

It is also known to synchronize uplink communications in order to distinguish them by their orthogonal codes. But this synchronization is not currently used, because it is relatively complex to realize.

CDMA telecommunication systems face the difficult problem of elimination of interference for receivers, because all communications received simultaneously strongly interfere with each other. To solve this problem for uplink transmissions, at the central station, conventional rake receivers are used which detect the signals having the correct scrambling or PN sequence and which can cancel the effects of multipath transmissions. But this kind of processing is generally insufficient for CDMA due to the strong interference effect of other communications. This is more particularly true when the number of simultaneous users, or communications, is high. It must also be noted that the signals which have the most detrimental interfering effect are those which have the highest power.

It is the reason why, at the central station, it is preferable for each user, to take into account the effect of other users and to subtract the interfering communications, for instance the most powerful communications, from the communication to be detected.

One straightforward embodiment of this method is to detect the most powerful signals prior to subtracting their contribution to the remaining users.

In order to limit the expenditure. it may be possible to limit the amount of interference detections, but this limitation entails a limitation of interference cancellations. In this situation, in order to obtain the required quality of communication, it is necessary to increase, through a control by the central station, the transmission power of the least powerful terminals. This may happen, for instance, when the number of high bit rate users (which have the most powerful transmitters) increases with respect to the number of telephone (speech) users having a lower bit rate transmission, and therefore, a lower power. But, this increase of power is not always possible because of the limited power availability in the terminals. Anyway, it is generally preferable to decrease the amount of power used by each terminal.

SUMMARY OF THE INVENTION

The invention provides a simple and efficient solution to the problem of detection of interfering high power users for uplink communications.

The telecommunication method according to the invention is characterized in that, at least some of the most powerful interfering signals are controlled in such a way that groups of symbols of these signals are time aligned when they reach the central station.

The synchronized groups of symbols may be, for instance, frames, time slots, or integer fractions of time slots.

In view of the time alignment, or synchronism, it is possible to perform a joint detection of the interfering users and to easily perform interference cancellation. The joint detection entails better results of interference signal detection and cancellation.

As, statistically, in a communication system, the number of high bit rate users (with the highest power) is generally much less than the number of low bit rate users, the time alignment control may be simple to implement if it is performed only on those high bit rate users.

It is also to be noted that the time alignment which is necessary in the frame of the invention needs a low accuracy of alignment, but not necessarily an accuracy of alignment between chip intervals. In fact, the synchronism used by the invention needs much less accuracy than the accuracy which would be necessary for the synchronism between users which are distinguished by their Hadamard sequences. For instance, the synchronization which would be necessary for maintaining the orthogonality between codes when they are received at the central station, would require an accuracy of $\pm t_c/10$ where $t_c$ is the Chip time. But, in order to maintain a synchronism between groups of symbols having a duration of $t_s/20$, $t_s$ being the Time Slot, an accuracy of $\pm 2t_c$ may be sufficient, if the spread factor (number of chip intervals per symbol) is 4, for instance.

The timing control of the related terminals may be performed either from the central station or from another level, for instance from the radio network controller (RNC) of the UMTS system.

The invention relates to a telecommunication method, wherein terminals communicate through a central station, uplink and downlink communications are coded with a spread spectrum sequence, and terminals have different powers and, at the central stations interference cancellation is performed in order to reduce the interfering effect of the highest power signals on the detected lowest power signals. The invention is characterized by the fact that, at least for some of the most powerful interfering signals, groups of symbols of different interfering signals are time aligned when they reach the central station.

In an embodiment, the synchronized groups of symbols are synchronously detected at the central station and are processed jointly prior to be subtracted from the signal to be detected.

In an embodiment, the control of time alignment of groups of symbols of different interfering signals is performed from the central station.

In an embodiment, said synchronization is performed between frames of said interfering signals.

In an embodiment, said synchronization is performed between time slots of said interfering signals.

In an embodiment, said synchronization is performed between integer fractions of time slots of said interfering signals.

In an embodiment, the accuracy of time alignment is of several chip intervals of the spread spectrum sequence.

In an embodiment, the highest powers are granted to the highest data rates, and the transmission power of terminals is centrally controlled.

The invention relates also to a central station for a telecommunication system wherein terminals communicate through this central station, the digital data received by the central station and transmitted by this central station being coded by Hadamard and scrambling sequences, and wherein the communications received from the terminals having different powers, interference cancellation means are provided at the central station in order to subtract the most powerful interference signals from the received least powerful signals, said central station having control means in order that groups of symbols of the most powerful received communications be time aligned at reception by said central station.

In an embodiment, for interference cancellation, the time-aligned signals are jointly detected and processed.

In an embodiment, the highest power is granted to the highest data rates and the transmission power of terminals is controlled by said station.

BRIEF DESCRIPTION OF THE DRAWING

Other features and advantages of the invention will appear with the description of certain of its embodiments, this description being made with reference to the herein-appended drawings, wherein:

FIG. 1 represents a conventional mobile telecommunication system,

FIG. 2a and FIG. 2b are diagrams representing two types of time slots of a conventional CDMA telecommunication system.

DETAILED DESCRIPTION OF THE INVENTION

Figure 3:
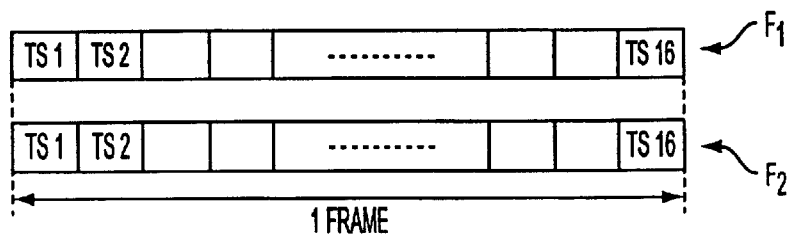
FIG. 3, FIG. 4 and FIG. 5 are diagrams representing examples of a method according to the invention.

The example of the invention which will be described with the drawings relates to a telecommunication system of the UMTS type wherein CDMA is used in order to distinguish users or to distinguish the types of communications.

FIG. 1 recalls the general structure of such a telecommunication system.

In this system, a territory is divided into cells $10_1$, $10_2$, $10_3$, $10_4$, wherein each cell, for instance cell $10_1$, comprises a base, or central, station $B_1$. In each cell, the terminals $T_1$, $T_2$, $T_3$, $T_4$, etc. communicate only through the central station $B_1$. In other words, the terminal $T_1$ cannot communicate directly with terminal $T_2$, but through $B_1$, i.e. when $T_1$ sends a message to $T_2$, it sends an uplink message 12 to $B_1$ and $B_1$ sends a downlink message 14 to $T_2$. In order to establish a communication between a terminal in one cell, $10_1$ for example, and a terminal in another cell, for instance $10_3$, the terminal $T_1$ sends a message to $B_1$, $B_1$ sends a message to $B_3$, and $B_3$ sends the message to the called terminal $T_5$.

More generally, any terminal communicates with the general network through a central station.

In the CDMA system, all terminals use the same frequency resource, but their communications can be distinguished by the combination of a Hadamard sequence and of a scrambling sequence, or pseudo noise PN.

For uplink 12 communications, from a terminal $T_1$ to the base station $B_1$, the communications are distinguished by their PN, the Hadamard sequences $H_1$, $H_2$, etc. being used to distinguish between communications of different kinds which are transmitted by each terminal. In fact, one terminal can transmit for instance speech, data, Internet messages, faxes, video images and so on. Moreover, even if one terminal transmits only one kind of information, such as speech (telephone), it transmits and receives also control signals such as pilot signals and power control signals and such control signals have their own Hadamard sequence which is different from the Hadamard sequence of the information signal. For such uplink communications, the terminals in the same cell $10_1$ are distinguished by their PN, or scrambling, sequences.

For the downlink communications 14, from $B_1$ to $T_2$, terminals are distinguished by their Hadamard sequences.

Each Hadamard sequence is also combined with a PN sequence, the goal of which is to distinguish one cell from the neighboring cells. In other words, the PN sequence of cell $10_1$ for downlink communications is distinct from the PN sequence for the downlink communications in the neighboring cells $10_2$, $10_3$, $10_4$, etc.

In UMTS, all types of data are in a digital format wherein one element of information is a symbol which may be a bit, or several bits in case of PSK (Phase Shift Keying). The symbols are transmitted in time slots $t_s$ and 16 time slots form a frame F. In this example, the duration of a time slot is 0.625 ms.

The number of symbols in a time slot and the power of the transmission depend on the data rate of the communication. In the example, use is made of WCDMA (Wide band CDMA) for which the bandwidth is 5 MHz. Each symbol is divided into chips, the duration of which is 0.244 μs. Therefore, one time slot contains 2560 chips.

For purpose of illustration, FIG. 2a and FIG. 2b are diagrams showing two time slots. The first one (FIG. 2a) corresponds to a high data rate of 1 megabit/second and the second one (FIG. 2b) corresponds to a low data rate of 32 Kbit/second.

On FIG. 2a, one time slot contains 640 symbols. Therefore, each symbol has a duration of 4 chip intervals. In other words, each symbol is divided into four chip intervals, i.e. the spread factor is 4.

For the low data rates, corresponding to FIG. 2b, one time slot contains 20 symbols and each symbol contains 128 chips. In other words, for FIG. 2b, the spread factor is 128.

As shown, in case of low data rate (FIG. 2b), the power P, represented by the height of the time slot is smaller than the power in the case of a time slot for high data rate (FIG. 2a). In this way, the energy (power multiplied by time) may be of the same order of magnitude for low and high data rates.

During each chip interval i, the value of the chip is $a_i$ and the sequence of chip values $a_1 \ldots a_n$ (n being the number of chips in a symbol) is such that:

$$\sum_{i=1}^{i=n} a_i^2 = 1$$

The chip values form a Hadamard sequence such that two different Hadamard sequences, with chip values $a_i$ and $a_i'$, are orthogonal, i.e.:

$$\sum_{i=1}^{i=n} a_i a_i' = 0$$

In this way, when several synchronous time slots are received simultaneously by a receiver which must receive only data with a $H_p$ sequence, in this receiver, a $H_p$ multiplier is provided and time slots having this $H_p$ sequence will appear correctly at the output of the multiplier and time slots having orthogonal sequences will be reduced to zero.

Scrambling consists in multiplying the values of chips by a pseudo random sequence.

Hadamard sequences are only orthogonal if symbols are well synchronized. It is the reason why Hadamard codes are used generally to distinguish between communications sent by the same transmitter. However, it is possible to synchronize several communications transmitted by different receivers in order that they are received synchronously by a given receiver. But this synchronization is not easy to implement, because it must be very accurate, about 1/10 of a chip interval.

Communications with a high data rate, i.e. with high power, strongly interfere with communications having a smaller power, i.e. a smaller data rate. At the central station $B_1$, the low data rate communications must be processed in order to reduce the effect of high data rate communications. Without this processing, the signal to noise ration $E_b/N_o$ of such low data rate signals would be smaller than the required value. This processing comprises the detection of high data rate interfering signals and the subtraction of these interfering signals from the received low data rate signal.

According to the invention, in order to simplify this processing, at least the most powerful interfering signals are coarsely time aligned. This time alignment enables a block processing of interfering signals at the central station.

It must be pointed out here that the synchronization between high power signals is a synchronization of groups of symbols, but not a synchronization of chips, because the goal is not to restore orthogonality between Hadamard sequences, but to establish a degree of synchronization between information symbols. It is also recalled that the incoming interfering signals may have the same Hadamard sequence.

In order to enable this coarse synchronization, the central station $B_1$ sends to the most powerful users (transmitting interfering signals) control signals which determine the delay(s) of each interfering signal with respect to one of them (or with respect to a reference), in order that they reach synchronously the central station, as required.

Figure 4:
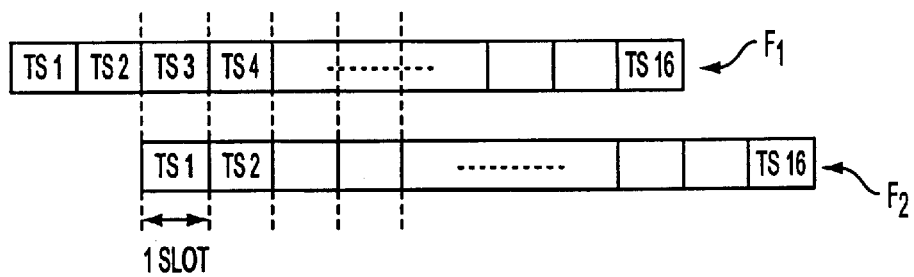
Figure 5:
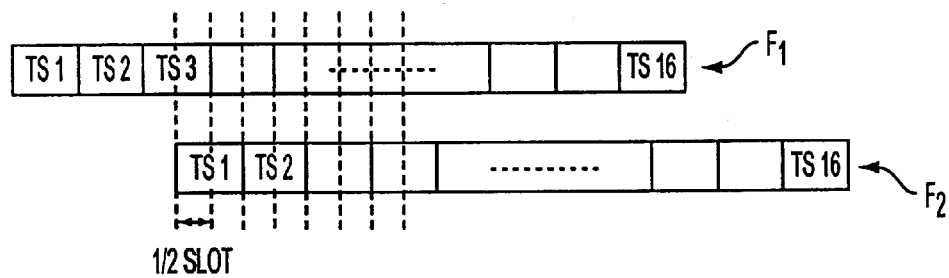

FIGS. 3, 4 and 5 show three examples of synchronization of two interfering signals at the level of the central station.

In the example of FIG. 3, the frames $F_1$ and $F_2$ of the interfering signals are time aligned. Therefore, during a frame period (sixteen time slots) the two interfering signals may be considered as a block, preferably, several blocks and subtracted from the signal to detect.

In the example of FIG. 4, time slots are time aligned. As shown, time slot $TS_3$ of frame $F_1$ of the first signal is synchronized with time slot $TS_1$ of frame $F_2$ of the second signal.

In the example of FIG. 5, the synchronization is performed between half slots of interfering signals. As shown, the second half of time slot $TS_3$ of frame $F_1$ of the first interfering signal is synchronized with the first half of time slot $TS_1$ of frame $F_2$ of the second interfering signal.

At the central station, the processing for interference cancellation is performed with a period corresponding to the synchronization period or a fraction of this period. In the case of FIG. 3, the maximum processing period is a frame period. In the case of FIG. 4, the maximum processing period is a time slot and in the case of FIG. 5, the maximum processing period is half a time slot.

It is also possible to provide a time alignment of several frames or a time alignment of an integer fraction, smaller than ½, for instance 1/20, of a time slot. The synchronization period may be chosen once for all or may be variable.

A long synchronization period has the advantage of a simpler processing and a short synchronization period has the advantage to enable an earlier synchronization between interfering signals.

The degree of accuracy of time alignment may be of several chip intervals.

Figure 6:
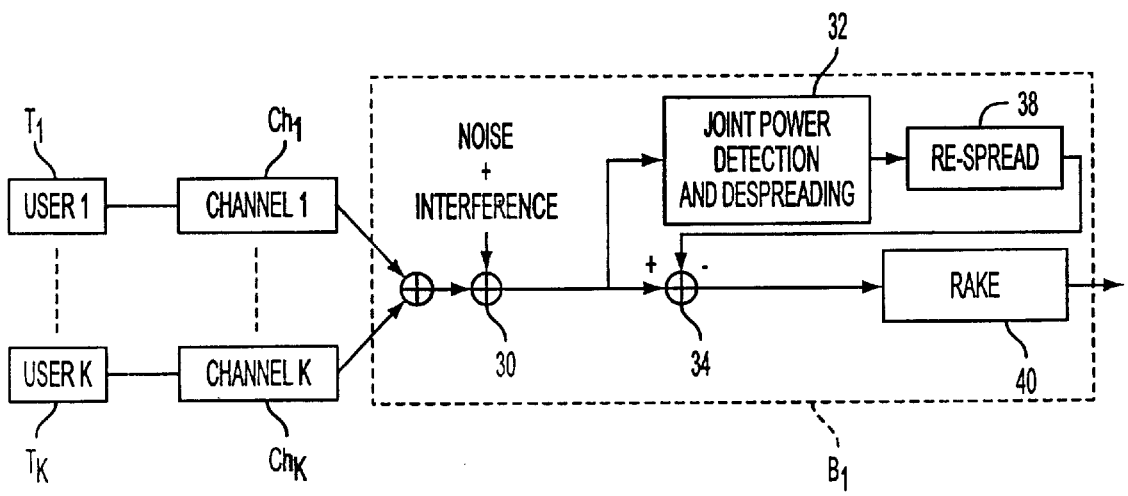
FIG. 6 represents an embodiment of the system according to the invention.

FIG. 6 shows how interference cancellation can be realized at the central station. On this FIG. 6, it is supposed that k terminals $T_1 \ldots T_k$ are present and active in the cell. Each terminal occupies a channel $Ch_1 \ldots Ch_k$. Among these k terminals, a small number transmit high data rate signals.

All the signals are transmitted to the central station $B_1$. This central station $B_1$ receives also interfering signals and noise coming from other cells as symbolically represented by the adder 30.

At center station $B_1$, in order to detect the signal transmitted by a given terminal, more particularly a signal at a low data rate, the few interfering signals having a high data rate are first detected and controlled in such a way that they are time aligned when they reach the central station $B_1$. Afterwards these time aligned signals are jointly detected (32) and block processed. The detection includes here a despreading. These jointly detected interfering signals are subtracted from the incoming signal, as shown, also symbolically, by subtractor 24. As joint detection 32 includes a despreading of Hadamard and PN sequences, it is necessary to respread (38) the processed signals before applying it to the subtractor 34; the respreading includes the reallocation of Hadamard and PN sequences and also of channel gains in order that the signal provided to subtractor 34 corresponds to the corresponding signals at the output of adder 30.

The signal provided by the subtractor 34 is submitted to a classical channel receiver, i.e. to a conventional rake (block 40 on FIG. 6).

The processing on FIG. 6 may be controlled from another location than the central station, for instance from a network controller.

What is claimed is:

1. A telecommunication method, comprising the steps of:
   a plurality of terminals communicating through a central station;
   coding uplink and downlink communications with a spread spectrum sequence;
   performing interference cancellation at the central station on particular signals transmitted from said plurality of terminals with different powers, in order to reduce the interfering effect of the detected highest power signals on the detected lowest power signals; and
   controlling the transmission of at least for some of the most powerful interfering signals such that groups of symbols of the different interfering signals are time aligned when they reach the central station.

2. A method according to claim 1, wherein: the synchronized groups of symbols are synchronously detected at the central station and are processed jointly prior to being subtracted from the signal to be detected.

3. A method according to claim 1, wherein: the control of time alignment of groups of symbols of different interfering signals is performed from the central station.

4. A method according to claim 1, wherein: said time alignment of said groups of signals is performed between frames of said interfering signals.

5. A method according to claim 1, wherein: time alignment of said groups of signals is performed between time slots of said interfering signals.

6. A method according to claim 1, wherein: time alignment of said groups of signals is performed between integer fractions of time slots of said interfering signals.

7. A method according to claim 1, wherein: the accuracy of time alignment is of several chip intervals of the spread spectrum sequence.

8. A method according to claim 1, wherein: the highest power signals have the highest data rates, and the transmission power of said terminals is centrally controlled.

9. A method according to claim 1, wherein said controlling step is performed in response to detected interference at said central station.

10. A central station for a telecommunication system wherein terminals communicate through said central station, the digital data received by the central station and transmitted by said central station being coded by Hadamard and scrambling sequences, and wherein the communications received from the terminals have different powers, and wherein said central station performs interference cancellation in order to subtract the most powerful interference signals from the received least powerful signals, characterized in that said central station comprises control apparatus for controlling transmission by said terminals such that groups of symbols of the most powerful received communications are time aligned at reception by said central station.

11. A central station according to claim 10, wherein the time-aligned signals are jointly detected and processed during interference cancellation.

12. A central station according to claim 10, wherein the highest power signals have the highest data rates, and the transmission power of said terminals is controlled by said central station.

13. A central station according to claim 10, wherein said control apparatus controls transmission by said stations in response to detected interference.

14. A method of reducing interference in a cellular telecommunication system wherein a plurality of terminals located within a cell communicate through a central station by transmitting and receiving signals coded with a spread spectrum sequence, said method comprising the steps of:
   detecting at said central station the signals transmitted by said plurality of terminals, the detected signals having different respective powers;
   determining at said central station which detected signals are interfering signals; and
   controlling the transmission of at least some of the interfering signals in response to said determination such that the interfering signals are coarsely synchronized upon reaching said central station.

* * * * *